March 12, 1929.  L. E. LA BRIE  1,705,191

BRAKE APPLYING MEANS

Filed Dec. 3, 1927

Patented Mar. 12, 1929.

1,705,191

UNITED STATES PATENT OFFICE.

LUDGER E. LA BRIE, OF SOUTH BEND, INDIANA, ASSIGNOR TO BENDIX BRAKE COMPANY, OF SOUTH BEND, INDIANA, A CORPORATION OF ILLINOIS.

BRAKE-APPLYING MEANS.

Application filed December 3, 1927. Serial No. 237,376.

This invention relates to brakes, and is illustrated as embodied in novel operating means for a front wheel automobile brake. An object of the invention is to provide operating means which is readily adjustable to compensate for the wear of the brake.

In one desirable arrangement the operating means includes two parts, which may be steel stampings, if desired, and one of which is fixed on the shaft and formed with a flange facing toward the shaft and curved about the axis of the shaft, while the other one is provided with wedge recesses for rollers or other parts which are wedged against the curved flange to lock the two parts together. One of the two parts serves as an operating lever for the brake applying shaft and by the above described arrangement it can be moved angularly with respect to the shaft in one direction to take up for the wear of the brake, but it is prevented from movement in the other direction with respect to the shaft, by the wedging of the above described parts, so that when moved in that direction it operates the shaft.

Preferably, a novel plate is secured on the end of the shaft in such a manner as to block the ends of the recess and to confine the wedged parts in their respective recesses. In the illustrative embodiment this plate co-operates with the part which is fixed to the shaft, the plate and said parts blocking the opposite ends of the recesses.

Figure 1:
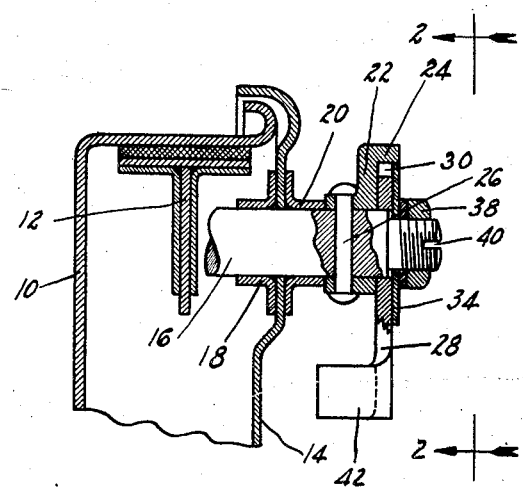
Figure 2:
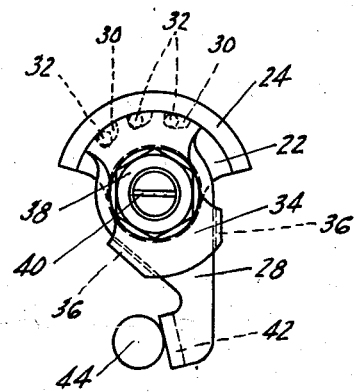

The above and other objects and features of the invention, including various novel and desirable structural details, will be apparent from the following description of one illustrative embodiment shown in the accompanying drawing, in which:

Figure 1 is a partial vertical section through the upper portion of a front wheel automobile brake, showing the novel operating means partly in rear elevation and partly in vertical section; and Figure 2 is a side elevation of the operating means looking in the direction of the arrows 2—2 of Figure 1.

In the illustrated arrangement, the brake includes a rotatable drum 10 within which is arranged the friction means 12 of the brake, and at the open side of which there is a suitable stationary support such as a backing plate 14. The friction means 12 is applied to the drum 10 by any suitable means (not shown) operated by a cam shaft 16 journaled in a bearing provided by tubular portions, drawn in opposite directions, on two stampings 18 and 20 welded or otherwise secured to opposite sides of the backing plate 14. The present invention relates to the means for operating the shaft 16 or its equivalent.

The shaft 16 is preferably provided with a part or device 22 having a flange 24 curved about the axis of the shaft 16, the device 22 being secured to the shaft in any desired manner, as for example by means of a key or pin 26. A stamped part 28 forming an operating lever for the shaft is sleeved on the shaft immediately beyond the device 22, and is shown as formed in its outer edge with wedged recesses 30 for small rollers or equivalent parts 32 which are wedged against the flange 24 by movement of the arm or lever 28 in a counterclockwise direction in Figure 2.

The parts 32 are confined in the recesses 30 by the device 22 which blocks the left ends of the recesses in Figures 1, together with a plate 34 in the form of a stamping having flanges 36 engaging opposite sides of the lever 28. The plate 34 is slipped on a reduced diameter portion of the shaft 16 which is threaded to receive a nut 38 clamping the entire assembly together. The end of the shaft 16 may be provided with a slot 40 for a screw driver or equivalent tool which may be used to hold the shaft while the adjustment is being made. The arm 28 in its illustrated form is laterally offset at 42 at its lower end for thrust engagement with an operating part 44, which may be a spherical ball integrally formed on the end of a lever fulcrumed on the front axle.

It will be seen that the lever 28 may readily be turned in a clockwise direction in Figure 2 with respect to the shaft 16 and part 22 to adjust the lever to compensate for wear of the brake, but that it cannot be turned on the shaft in a counterclockwise direction, on account of the wedging or gripping of the parts 32 against the flange 24, that is, the arm 28 may be adjusted on the shaft in a brake releasing direction, but cannot be turned on the shaft in a brake applying direction.

While one illustrative embodiment has been described in detail, it is not my intention to limit the scope of the invention to that particular embodiment or otherwise than by the terms of the appended claims.

I claim:

1. Operating means comprising, in combination with a shaft, a device fixed on the shaft and formed with a portion facing toward the shaft and curved about the axis of the shaft, an arm on the shaft having a portion immediately adjacent said portion of the device, one of said portions having wedge recesses, and parts in said recesses and wedged against the other of said portions to connect the arm operatively with said shaft, together with a plate secured on the end of the shaft and confining said parts in their respective recesses.

2. Operating means comprising, in combination with a shaft, a device fixed on the shaft and formed with a flange curved about the axis of the shaft, an arm on the shaft having a portion fitting within said flange and formed with wedge recesses, and parts in said recesses and wedged against said flange to connect the arm operatively with said shaft, together with a part secured to the end of the shaft and blocking the ends of the recesses to confine said parts in their respective recesses.

3. Operating means comprising, in combination, a shaft having at its end a threaded portion of reduced diameter, a device secured on the part of greater diameter adjacent the end of the shaft, an arm freely sleeved on the part of greater diameter beside said device, means adjustably connecting the arm and said device, a plate holding said means in place and sleeved on the part of reduced diameter, and a nut threaded on the end of the shaft and holding said plate.

In testimony whereof, I have hereunto signed my name.

LUDGER E. LA BRIE.